United States Patent
Matsuyama

(10) Patent No.: US 8,914,214 B2
(45) Date of Patent: Dec. 16, 2014

(54) BRAKE PRESSURE COMPUTING APPARATUS, BRAKE CONTROL SYSTEM, AND NON-TRANSITORY COMPUTER-READABLE MEMORY MEDIUM

(75) Inventor: Etsuji Matsuyama, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 6 days.

(21) Appl. No.: 13/991,096

(22) PCT Filed: Jan. 25, 2011

(86) PCT No.: PCT/JP2011/051297
§ 371 (c)(1),
(2), (4) Date: May 31, 2013

(87) PCT Pub. No.: WO2012/101757
PCT Pub. Date: Aug. 2, 2012

(65) Prior Publication Data
US 2013/0261857 A1    Oct. 3, 2013

(51) Int. Cl.
*B60T 13/00* (2006.01)
*B60T 8/17* (2006.01)
*B60T 17/22* (2006.01)
*B60T 8/174* (2006.01)

(52) U.S. Cl.
CPC .............. *B60T 17/228* (2013.01); *B60T 8/1705* (2013.01); *B60T 8/174* (2013.01)
USPC ................................. 701/78; 701/19; 303/155

(58) Field of Classification Search
CPC ..... B60T 8/1705; B60T 17/228; B60T 8/174; B60T 8/172; B60T 8/171
USPC ........ 701/19, 70, 78; 303/128, 134, 155, 177, 303/191, 20, DIG. 1, DIG. 2
See application file for complete search history.

(56) References Cited

U.S. PATENT DOCUMENTS

| | | | |
|---|---|---|---|
| 6,754,568 B1* | 6/2004 | Ripley | 701/32.8 |
| 2011/0029213 A1* | 2/2011 | Itano | 701/70 |

FOREIGN PATENT DOCUMENTS

| | | | |
|---|---|---|---|
| JP | 3-235748 A | 10/1991 |
| JP | 7-174774 A | 7/1995 |

(Continued)

OTHER PUBLICATIONS

Office Action (Notification of Reasons for Rejection) issued on Aug. 16, 2011, by the Japanese Patent Office in corresponding Japanese Patent Application No. 2011-528118, and an English Translation of the Office Action. (4 pages).

(Continued)

*Primary Examiner* — Mary Cheung
*Assistant Examiner* — Rodney Butler
(74) *Attorney, Agent, or Firm* — Buchanan Ingersoll & Rooney PC

(57) ABSTRACT

A brake pressure computing apparatus acquires a target cylinder pressure which is a target value of the pressure inside the brake cylinder of an air brake, and is equipped with a target cylinder pressure acquirer, a deceleration differential information acquirer, and a target cylinder pressure correction value acquirer. The target cylinder pressure acquirer acquires a target cylinder pressure on the basis of a required braking force and a target cylinder pressure correction value. The deceleration differential information acquirer acquires deceleration differential information indicating the difference between the target value of the deceleration and the actual value of the deceleration. The target cylinder pressure correction value acquirer acquires the target cylinder pressure correction value on the basis of the deceleration differential information.

8 Claims, 14 Drawing Sheets

(56) References Cited

FOREIGN PATENT DOCUMENTS

| | | | |
|---|---|---|---|
| JP | 7-218520 A | 8/1995 | |
| JP | 08207607 A * | 8/1996 | ........... B60K 17/348 |
| JP | 11-235972 A | 8/1999 | |
| JP | 2000-052957 A | 2/2000 | |
| JP | 2003-160043 A | 6/2003 | |
| JP | 2007-091170 A | 4/2007 | |

OTHER PUBLICATIONS

International Search Report (PCT/ISA/210) issued on Apr. 5, 2011, by the Japanese Patent Office as the International Searching Authority for International Application No. PCT/JP2011/051297.

Written Opinion (PCT/ISA/237) issued on Apr. 5, 2011, by the Japanese Patent Office as the International Searching Authority for International Application No. PCT/JP2011/051297.

* cited by examiner

FIG.3

PRESSURE CORRECTION
VALUE TABLE

| DECELERATION DIFFERENTIAL | TARGET CYLINDER PRESSURE CORRECTION VALUE |
|---|---|
| 0.3km/s² ～ | 20kPa |
| 0.1 ～ 0.3km/s² | 10kPa |
| −0.1 ～ 0.1km/s² | 0kPa |
| −0.3 ～ −0.1km/s² | −10kPa |
| ～ −0.3km/s² | −20kPa |

# BRAKE PRESSURE COMPUTING APPARATUS, BRAKE CONTROL SYSTEM, AND NON-TRANSITORY COMPUTER-READABLE MEMORY MEDIUM

TECHNICAL FIELD

The present invention relates to a brake pressure computing apparatus that computes a target value of the pressure inside the brake cylinder of an air brake, to a brake control system equipped with such a brake pressure computing apparatus, and to a non-transitory computer-readable memory medium.

BACKGROUND ART

Patent Literature 1 discloses a railroad car (hereinafter, car) brake apparatus that pushes a brake shoe against a wheel to produce braking force by supplying air pressure to a brake cylinder. In this brake apparatus, the braking force required to set the deceleration of the car to a target value is computed, and the air pressure supplied to the brake cylinder is controlled such that this braking force is produced.

CITATION LIST

Patent Literature

Patent Literature 1: Unexamined Japanese Patent Application Kokai Publication No. H11-235972

SUMMARY OF INVENTION

Technical Problem

The coefficient of friction between a brake shoe and a wheel varies depending on the rotational speed of the wheel and the temperature and wear state of the brake shoe. In the case of controlling the air pressure of a brake cylinder without taking into account the change in the coefficient of friction, there is a risk that the braking force may change according to the change in the coefficient of friction, and the car deceleration will no longer match the target value.

For example, the coefficient of friction becomes greater as the rotational speed of the wheel reduces. For this reason, in a state where the air pressure of the brake cylinder is kept constant, the braking force increases during the process of the car speed decreasing, and as illustrated in FIG. 13, the car deceleration gradually becomes greater, and the difference from the target value widens.

In addition, when the car travels on a hill, gravity changes the car deceleration, decreasing the car deceleration when the car descends a hill. Thus, in the case where the air pressure of a brake cylinder is kept constant from before descending a hill, the car deceleration will become less than the target value when descending the hill, as illustrated in FIG. 14. In this way, the actual deceleration of the car diverges from the target value in the case of setting a target value of the air pressure of a brake cylinder without taking into account the effects of the operational environment, such as gravity.

The present invention, being devised in light of the above matters, has as an object to provide a brake pressure computing apparatus able to apply control to keep the car deceleration near a target value, a brake control system equipped with such a brake pressure computing apparatus, and a non-transitory computer-readable memory medium.

Solution to Problem

In order to achieve the above object, a brake pressure computing apparatus according to a first aspect of the present invention is a brake pressure computing apparatus that acquires a target cylinder pressure, the target cylinder pressure being a target value of the pressure inside the brake cylinder of an air brake, and is equipped with a target cylinder pressure acquirer, a deceleration differential information acquirer, a pressure differential information acquirer and a target cylinder pressure correction value acquirer. The target cylinder pressure acquirer acquires a target cylinder pressure on the basis of a required braking force and a target cylinder pressure correction value. The deceleration differential information acquirer acquires deceleration differential information indicating the difference between the target value of the deceleration and the actual value of the deceleration. The pressure differential information acquirer acquires pressure differential information indicating the difference between the target cylinder pressure and the actual value of the pressure inside the brake cylinder. The target cylinder pressure correction value acquirer acquires the target cylinder pressure correction value on the basis of the deceleration differential information and the pressure differential information. The target cylinder pressure correction value acquirer sets a sign of the target cylinder pressure correction value to positive or negative on the basis of the deceleration differential information, and sets an absolute value of the target cylinder pressure correction value on the basis of the pressure differential information.

A brake control system according to a second aspect of the present invention is equipped with a brake pressure computing apparatus according to the first aspect, and a pressure generator. The pressure generator produces pressure inside the brake cylinder of the air brake on the basis of the target cylinder pressure computed by the brake pressure computing apparatus.

A brake control system according to a third aspect of the present invention is provided with multiple brake pressure computing apparatuses according to the first aspect, and in the case where a malfunction occurs in one of the brake pressure computing apparatuses, another of the brake pressure computing apparatuses acquires the target cylinder pressure on the basis of required braking force computed for the first brake pressure computing apparatus.

A non-transitory computer-readable memory medium according to a fourth aspect of the present invention stores a program that acquires a target cylinder pressure, the target cylinder pressure being a target value of the pressure inside the brake cylinder of an air brake. The program causes a computer to function as target cylinder pressure acquiring means that acquires the target cylinder pressure on the basis of a required braking force and a target cylinder pressure correction value, deceleration differential information acquiring means that acquires deceleration differential information indicating the difference between the target value of the deceleration and the actual value of the deceleration, pressure differential information acquiring means that acquires pressure differential information indicating the difference between the target cylinder pressure and the actual value of the pressure inside the brake cylinder, and target cylinder pressure correction value acquiring means that acquires the target cylinder pressure correction value on the basis of the deceleration differential information and the pressure differential information. The target cylinder pressure correction value acquiring means sets a sign of the target cylinder pressure correction value to positive or negative on the basis of the deceleration differential information, and sets an absolute value of the target cylinder pressure correction value on the basis of the pressure differential information.

Advantageous Effects of Invention

According to the present invention, by acquiring a target cylinder pressure correction value on the basis of deceleration differential information, and acquiring a target cylinder pressure on the basis thereof, it is possible to control the value of the target cylinder pressure so as to reduce the difference between the target value and the actual value of the deceleration. Thus, control can be applied to keep the car deceleration near a target value, even when the coefficient of friction is inconsistent or when the car is traveling on a hill.

BRIEF DESCRIPTION OF DRAWINGS

FIG. 3 is a diagram illustrating a pressure correction value table;

DESCRIPTION OF EMBODIMENTS

Embodiment 1

Figure 1:
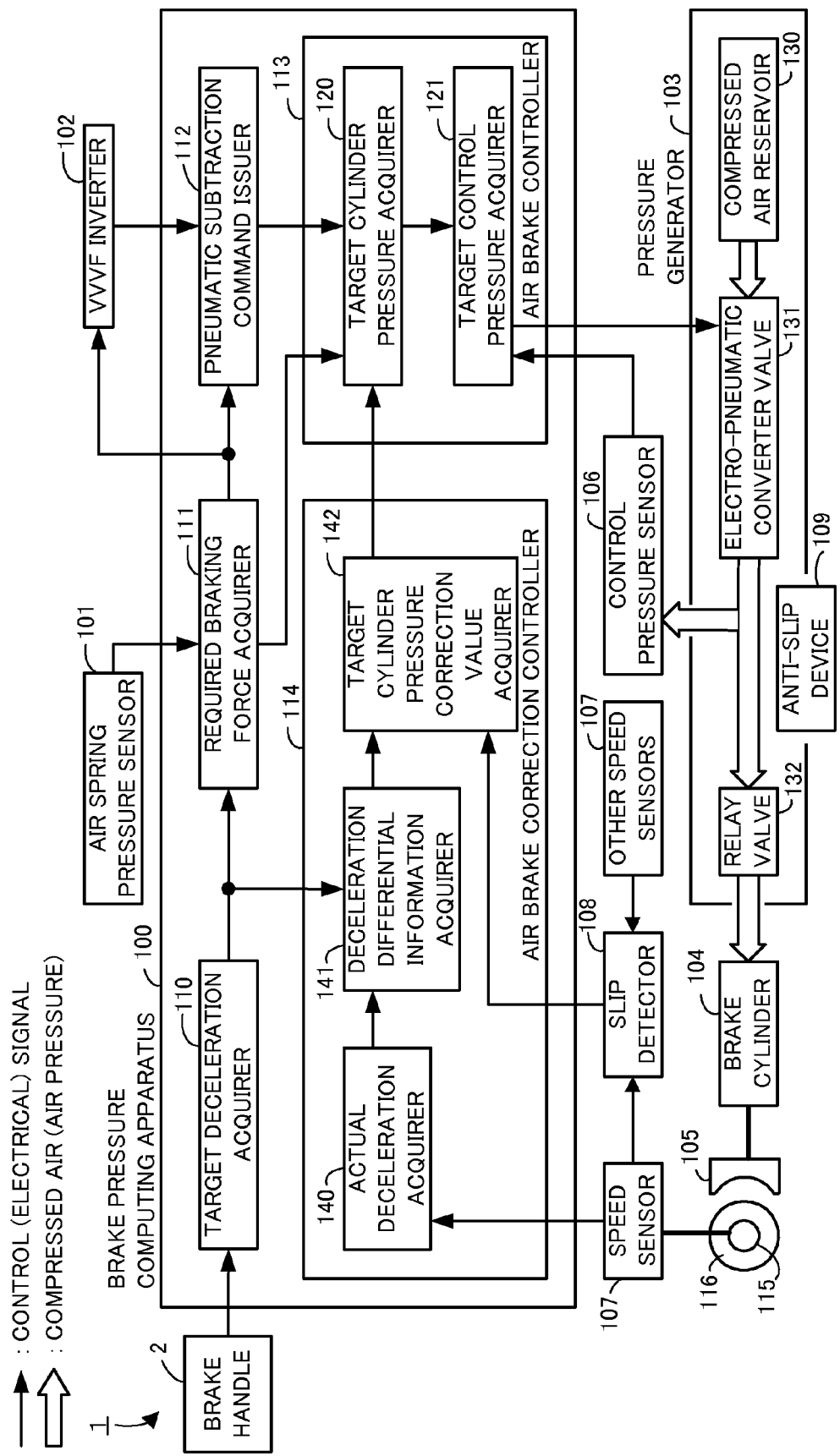
FIG. 1 is a block diagram of a brake control system according to Embodiment 1 of the present invention.

Hereinafter, Embodiment 1 of the present invention will be described. Embodiment 1 is applied to a railroad car (hereinafter, car) provided with four driving axles 115 (FIG. 1). The car is equipped with a body that houses passengers, a front side truck and a back side truck disposed under the car body, with each truck being supported by two driving axles 115. Wheels 116 that rotate over a rail are attached to either end of each driving axle 115.

As illustrated in FIG. 1, the brake control system 1 according to Embodiment 1 is equipped with a brake pressure computing apparatus 100, an air spring pressure sensor 101, a VVVF (Variable Voltage Variable Frequency) inverter 102, a pressure generator 103, a brake cylinder 104, a brake shoe 105, a control pressure sensor 106, a speed sensor 107, a slip detector 108, and an anti-slip device 109. Of these, the brake pressure computing apparatus 100, the pressure generator 103, the brake cylinder 104, the brake shoe 105, the control pressure sensor 106, the speed sensor 107, and the anti-slip device 109 are provided for each driving axle 115. Hereinafter, among the four driving axles 115 provided in the car, the driving axle 115 targeted for control by the brake control system 1 will be designated as the target driving axle 115, while the three other driving axles 115 will be designated as the other driving axles 115.

The brake pressure computing apparatus 100 is an apparatus that acquires a target value of the pressure inside the brake cylinder 104 of the air brake, and is equipped with a target deceleration acquirer 110, a required braking force acquirer 111, a pneumatic subtraction command issuer 112, an air brake controller 113, and an air brake correction controller 114. Hereinafter, pressure inside the brake cylinder 104 will be designated as the cylinder pressure, and a target value of the cylinder pressure will be designated as the target cylinder pressure.

A brake command specifying a deceleration target value is input into the target deceleration acquirer 110 from a brake handle 2 installed in the driver's cab (not illustrated). In response to the brake command, the target deceleration acquirer 110 outputs a signal indicating a deceleration target value (hereinafter, the target deceleration signal) to the required braking force acquirer 111 and the air brake correction controller 114.

The air spring pressure sensor 101 outputs an air spring pressure signal indicating the total weight of the car, including the weight of the passengers, to the required braking force acquirer 111.

The required braking force acquirer 111 computes the braking force required to set the deceleration to the target value (hereinafter, the required braking force) on the basis of the deceleration target value indicated by the target deceleration signal and the total weight indicated by the air spring pressure signal. Also, the required braking force acquirer 111 sets the portion of the computed required braking force contributed by regenerative braking (regenerative braking torque; regenerative braking force), and outputs a regenerative braking torque command specifying this regenerative braking torque to the VVVF inverter 102 and the pneumatic subtraction command issuer 112. Furthermore, the required braking force acquirer 111 sets the force contributed by the air brake (hereinafter, the air braking force) by subtracting the force contributed by the regenerative braking torque from the required braking force, and outputs an air braking force signal indicating the air braking force to the air brake controller 113.

The VVVF inverter 102 controls an electric motor (not illustrated) on the basis of the regenerative braking torque command, causing the electric motor to function as a regenerative brake. Also, the VVVF inverter 102 outputs a signal indicating the actual value of the regenerative braking force (hereinafter, the actual regenerative braking signal) to the pneumatic subtraction command issuer 112.

The pneumatic subtraction command issuer 112 computes the difference obtained by subtracting the actual value of the regenerative braking force indicated by the actual regenerative braking signal from the set value for the regenerative braking force indicated by the regenerative braking torque command supplied from the required braking force acquirer 111 (hereinafter, the regenerative braking force differential), and outputs a pneumatic subtraction command indicating the regenerative braking force differential to the air brake controller 113.

The pressure generator 103 is equipped with a compressed air reservoir 130, an electro-pneumatic converter valve 131, and a relay valve 132. The compressed air reservoir 130 stores compressed air for the air brake. The electro-pneumatic converter valve 131 controls the pressure of compressed air supplied from the compressed air reservoir 130, and outputs air pressure in accordance with a valve command from the air brake controller 113. The relay valve 132 amplifies the air pressure output by the electro-pneumatic converter valve 131, and supplies the result to the brake cylinder 104 as compressed air. The brake cylinder 104 presses the brake shoe 105 against the target driving axle 115 or the wheel 116 due to the cylinder pressure, applying an air brake to the car. The control pressure sensor 106, disposed in a duct between the electro-pneumatic converter valve 131 and the relay valve 132, detects the air pressure output by the electro-pneumatic converter valve 131, and outputs a specific air pressure signal indicating the output air pressure to the air brake controller 113.

The speed sensor 107 measures the rotational speed of the target driving axle 115, and outputs a signal indicating the measured value (hereinafter, the rotational speed signal) to the air brake correction controller 114 and the slip detector 108.

Rotational speed signals are input into the slip detector 108 from speed sensors 107 provided for the target driving axle 115 and the three other driving axles 115. The slip detector 108 computes the maximum value or the average value of the rotational speeds indicated by the respective signals, and also computes the deviation of the rotational speed of the target driving axle 115 with respect to the maximum value or the average value. In the case where the deviation has exceeded a given value, the slip detector 108 outputs a signal indicating that a slip has occurred (hereinafter, the slip signal) to the anti-slip device 109 and the air brake correction controller 114.

The anti-slip device 109 is provided in order to prevent slippage of a wheel 116, and is equipped with a valving element that controls air pressure supplied to the relay valve 132 from the electro-pneumatic converter valve 131. The anti-slip device 109 adjusts the opening of the valving element in response to the slip detection signal from the slip detector 108, decreasing the air pressure supplied to the relay valve 132.

The air brake correction controller 114 is equipped with an actual deceleration acquirer 140, a deceleration differential information acquirer 141, and a target cylinder pressure correction value acquirer 142.

By the rotational speed signal supplied from the speed sensor 107, the actual deceleration acquirer 140 acquires the amount of change in the rotational speed per unit time as the actual value of the deceleration.

The deceleration differential information acquirer 141 acquires deceleration differential information indicating the differential obtained by subtracting the actual value of the deceleration from the target value of the deceleration indicated by the target deceleration signal (hereinafter, the deceleration differential).

Figure 2:
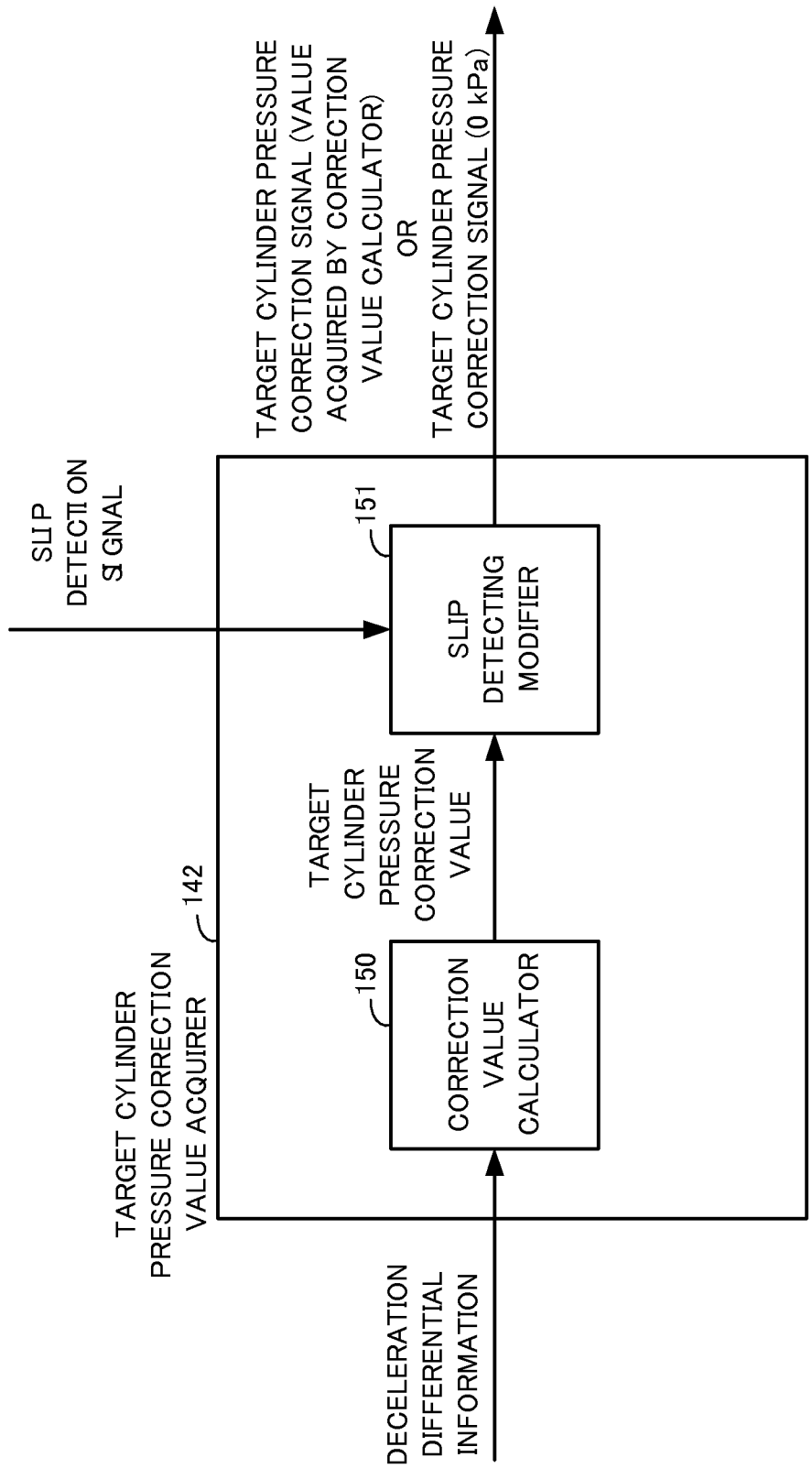
FIG. 2 is a block diagram illustrating a configuration of a target cylinder pressure correction value acquirer.

As illustrated in FIG. 2, the target cylinder pressure correction value acquirer 142 is equipped with a correction value calculator 150 and a slip detecting modifier 151.

The correction value calculator 150 acquires a target cylinder pressure correction value on the basis of the deceleration differential indicated by the deceleration differential information. The target cylinder pressure correction value is acquired using the pressure correction value table illustrated in FIG. 3. In the pressure correction value table, deceleration differentials are classified into five ranges, and a target cylinder pressure correction value is associated with each of these ranges. Positive target cylinder pressure correction values are associated with ranges having positive deceleration differential values. This is for the purpose of raising the cylinder pressure and increasing the braking force in the case of a positive deceleration differential value (the case where the target value of the deceleration is greater than the actual value). Also, negative target cylinder pressure correction values are associated with ranges having negative deceleration differentials. This is for the purpose of lowering the cylinder pressure and decreasing the braking force in the case of a negative deceleration differential value (the case where the target value of the deceleration is less than the actual value). The absolute value of the target cylinder pressure correction value is set on the basis of the absolute value of the deceleration differential, such that the absolute value of the target cylinder pressure correction value is greater for ranges with a larger absolute value of the deceleration differential. This is for the purpose of adjusting the magnitude of the braking force such that the actual value of the deceleration matches the target value.

The slip detecting modifier 151 is provided in order to discontinue using the target cylinder pressure correction value to acquire a target cylinder pressure in the case where the car slips. The slip detecting modifier 151 determines whether or not a slip detection signal has been input from the slip detector 108, and in the case where a slip detection signal has not been input, outputs a target cylinder pressure correction signal indicating the correction value acquired by the correction value calculator 150 to a target cylinder pressure acquirer 120. Meanwhile, in the case where a slip detection signal has been input, the slip detecting modifier 151 outputs a target cylinder pressure correction signal indicating "0 kPa" to the target cylinder pressure acquirer 120.

Figure 4:
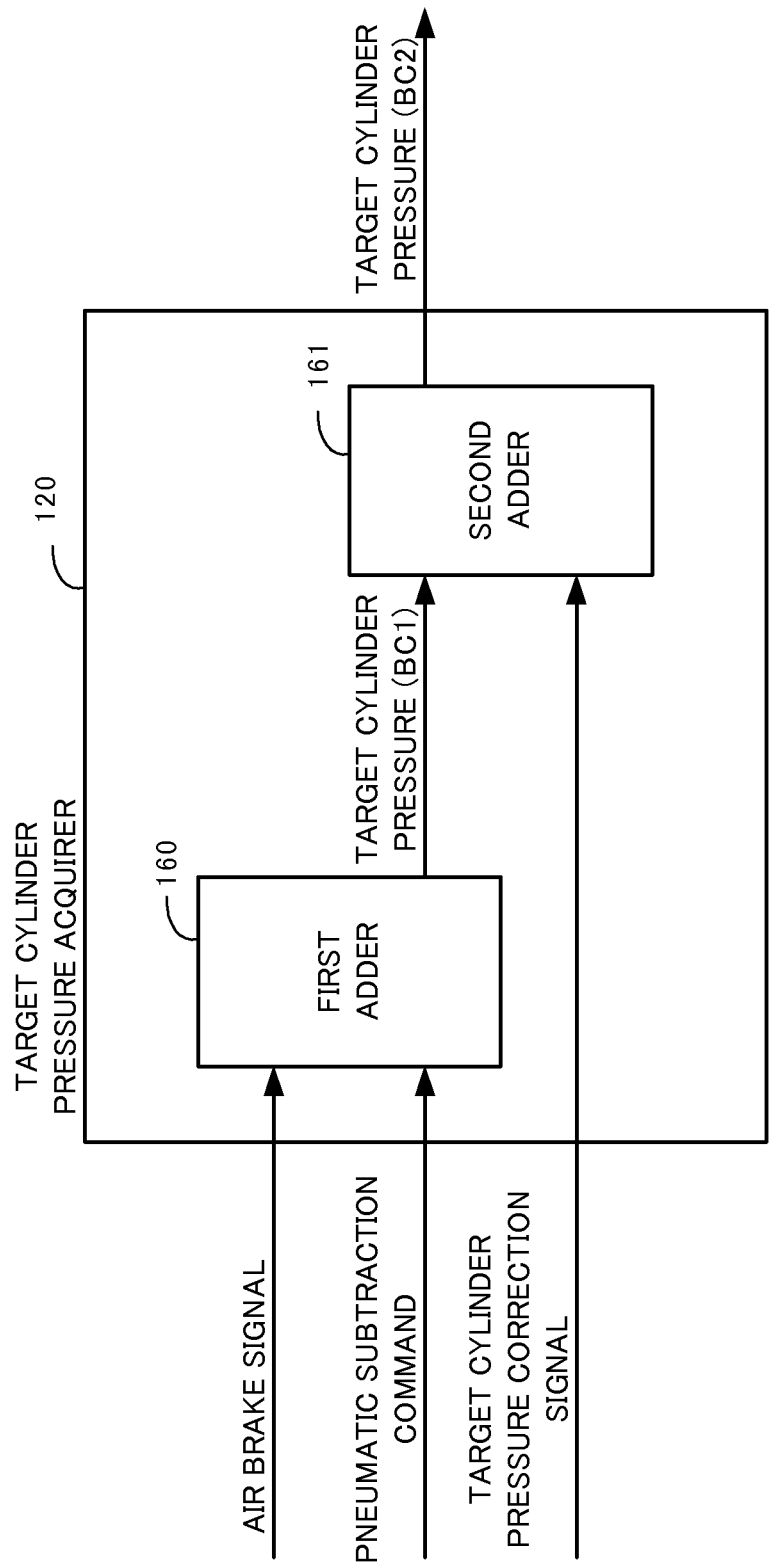
FIG. 4 is a block diagram illustrating a configuration of a target cylinder pressure acquirer.

As illustrated in FIG. 1, the air brake controller 113 is equipped with a target cylinder pressure acquirer 120 and a target control pressure acquirer 121. As illustrated in FIG. 4, the target cylinder pressure acquirer 120 is equipped with a first adder 160 and a second adder 161.

The first adder 160 acquires a target value of the air braking force by adding together the force contributed by the air brake indicated by the air braking force signal to the regenerative braking force indicated by the pneumatic subtraction command. The target value of the air braking force is equivalent to the value obtained by subtracting the actual value of the regenerative braking force from the required braking force. Additionally, the first adder 160 acquires a target cylinder pressure (BC1) using the target value of the air braking force. The target cylinder pressure (BC1) is acquired by substituting the target value of the air braking force into F in the following Eq. 1. Set values are used for the coefficient of friction f and the constant k.

$$F = kf(BC) \qquad \text{(Equation 1)}$$

(F: air braking force, k: constant, f: set value for coefficient of friction between brake shoe 105 and wheel 116 or the like, BC pressure: cylinder pressure)

The second adder 161 corrects the target cylinder pressure and acquires a target cylinder pressure (BC2) by adding the target cylinder pressure correction value indicated by the target cylinder pressure correction signal to the target cylinder pressure (BC1), and outputs a signal indicating the target cylinder pressure (BC2) (hereinafter, the target cylinder pressure signal) to the target control pressure acquirer 121. Note that in the case where the slip detector 108 outputs a slip detection signal, correction by the target cylinder pressure correction value is not conducted due to the target cylinder pressure correction value being modified to "0 kPa" by the slip detecting modifier 151, and the target cylinder pressure (BC2) matches the target cylinder pressure (BC1).

From the target cylinder pressure (BC2) indicated by the target cylinder pressure signal and the output air pressure indicated by the specific air pressure signal, the target control pressure acquirer 121 computes the output pressure from the electro-pneumatic converter valve 131 required to produce the target cylinder pressure (BC2), and outputs a valve command indicating a valve opening corresponding to the output pressure to the electro-pneumatic converter valve 131. Thus, the brake cylinder 104 is supplied with a cylinder pressure equivalent to the target cylinder pressure (BC2).

Hereinafter, a process executed in the case where a brake command specifying a deceleration target value of "1.8 km/h/s" is output from the brake handle 2 will be described as an example of a process by the brake control system 1 of Embodiment 1.

The target deceleration acquirer 110 outputs a target deceleration signal indicating the deceleration target value of "1.8 km/h/s" to the required braking force acquirer 111 and the air brake correction controller 114.

The required braking force acquirer 111 computes the braking force required to set the deceleration to the target value of "1.8 km/h/s" on the basis of the deceleration target value of "1.8 km/h/s" indicated by the target deceleration signal and the total weight indicated by the air spring pressure signal from the air spring pressure sensor 101. Furthermore, on the basis of the required braking force, the required braking force acquirer 111 sets the regenerative braking torque and the air braking force, outputs a regenerative braking torque command indicating the set value for the regenerative braking torque to the VVVF inverter 102 and the pneumatic subtraction command issuer 112, and outputs an air braking force signal indicating the air braking force to the air brake controller 113.

The VVVF inverter 102 causes the electric motor to function as a regenerative brake on the basis of the regenerative braking torque command, and in addition, outputs an actual regenerative braking signal indicating the actual value of the regenerative brake to the pneumatic subtraction command issuer 112. On the basis of the regenerative braking torque command and the actual regenerative braking signal, the pneumatic subtraction command issuer 112 computes the regenerative braking force differential, and outputs a pneumatic subtraction command indicating the regenerative braking force differential to the air brake controller 113.

The air brake controller 113 acquires a target value of the air braking force using the difference between the braking force indicated by the air braking force signal and the regenerative braking force indicated by the pneumatic subtraction command. In addition, the air brake controller 113 acquires a target cylinder pressure on the basis of the target value of the air braking force, and outputs a valve command corresponding to the target cylinder pressure to the pressure generator 103.

In response to the valve command, the pressure generator 103 supplies the brake cylinder with a cylinder pressure equivalent to the target cylinder pressure. As a result, given air braking force is obtained due to the pressure equivalent to the target cylinder pressure acting on the brake shoe 105. The rotational speed of the target driving axle 115 while in the state where the air braking is occurring is measured by the speed sensor 107, and a rotational speed signal indicating the measured value is transmitted from the speed sensor 107 to the slip detector 108 and the air brake correction controller 114.

The slip detector 108 receives rotational speed signals from the speed sensors 107 provided for the target driving axle 115 and the other driving axles 115, computes the deviation of the rotational speed of the driving axle 115, and in the case where the deviation exceeds a given value, outputs a slip signal to the air brake correction controller 114 and the anti-slip device 109.

The air brake correction controller 114 executes the following process due to being input with a target deceleration signal from the target deceleration acquirer 110 and a rotational speed signal from the speed sensor 107.

The actual deceleration acquirer 140 acquires the actual value of the deceleration from the rotational speed indicated by the rotational speed signal. As a result, an actual deceleration value of "1.6 km/h/s" is acquired, for example.

In this case, the deceleration differential information acquirer 141 acquires a deceleration differential of "0.2 km/h/s" by subtracting the actual deceleration value of "1.6 km/h/s" from the target deceleration value of "1.8 km/h/s" indicated by the target deceleration signal.

The correction value calculator 150 of the target cylinder pressure correction value acquirer 142 acquires a target cylinder pressure correction value of "10 kPa" associated with a deceleration differential of "0.2 km/h/s" in the pressure correction value table (FIG. 3).

In the case where a slip detection signal has not been input from the slip detector 108, the slip detecting modifier 151 of the target cylinder pressure correction value acquirer 142 outputs a target cylinder correction signal indicating a target cylinder pressure correction value of "10 kPa" to the air brake controller 113. Meanwhile, in the case where a slip detection signal has been input, the slip detecting modifier 151 outputs a target cylinder correction signal indicating a target cylinder pressure correction value of "0 kPa" to the air brake controller 113.

The air brake controller 113 executes the following process due to being input with a target cylinder correction signal from the target cylinder pressure correction value acquirer 142 (slip detecting modifier 151). Note that when executing the following process, the first adder 160 of the target cylinder pressure acquirer 120 acquires a target cylinder pressure BC1 by substituting a target value of the air braking force into Eq. 1.

In the case where a target cylinder correction signal indicating a target cylinder pressure correction value of "10 kPa" is input, the second adder 161 adds "10 kPa" to the target cylinder pressure BC1 to acquire a target cylinder pressure BC2 of "BC1+10 kPa", and outputs a target cylinder pressure signal indicating "BC1+10 kPa" to the target control pressure acquirer 121.

Meanwhile, in the case where a target cylinder pressure correction signal indicating a target cylinder pressure correction value of "0 kPa" is input due to a slip occurring, the second adder 161 does not correct the target cylinder pressure by acquiring a target cylinder pressure BC2 of "BC1 (BC1+0 kPa)", and outputs a target cylinder pressure signal indicating "BC1" to the target control pressure acquirer 121.

The target control pressure acquirer 121 outputs a valve command corresponding to the target cylinder pressure BC2 indicated by the target cylinder pressure signal ("BC1+10 kPa" or "BC1") to the pressure generator 103.

As a result, in the case where a slip has not occurred, the brake cylinder is supplied with a cylinder pressure equivalent to "BC1+10 kPa". Thus, the cylinder pressure is raised, the braking force increases, and the actual value of the deceleration becomes greater than "1.6 km/h/s" and approaches the target value of "1.8 km/h/s".

Meanwhile, in the case where a slip has occurred, the cylinder pressure supplied to the brake cylinder is not modified, and becomes equivalent to "BC1". Also, in the case where the slipping wheel is a wheel 116 where the brake pressure computing apparatus 100 is installed, a slip detection signal is input into the anti-slip device 109 from the corresponding slip detector 108, and the anti-slip device 109 decreases the air pressure supplied to the relay valve 132. Thus, braking force is reduced, and slipping is suppressed.

According to the present embodiment, by acquiring a target cylinder pressure correction value on the basis of a deceleration differential, and acquiring a target cylinder pressure on the basis thereof, it is possible to control the value of the target cylinder pressure so as to reduce deceleration differential. Thus, it is possible to apply control to keep the deceleration near a target value.

Figure 5:
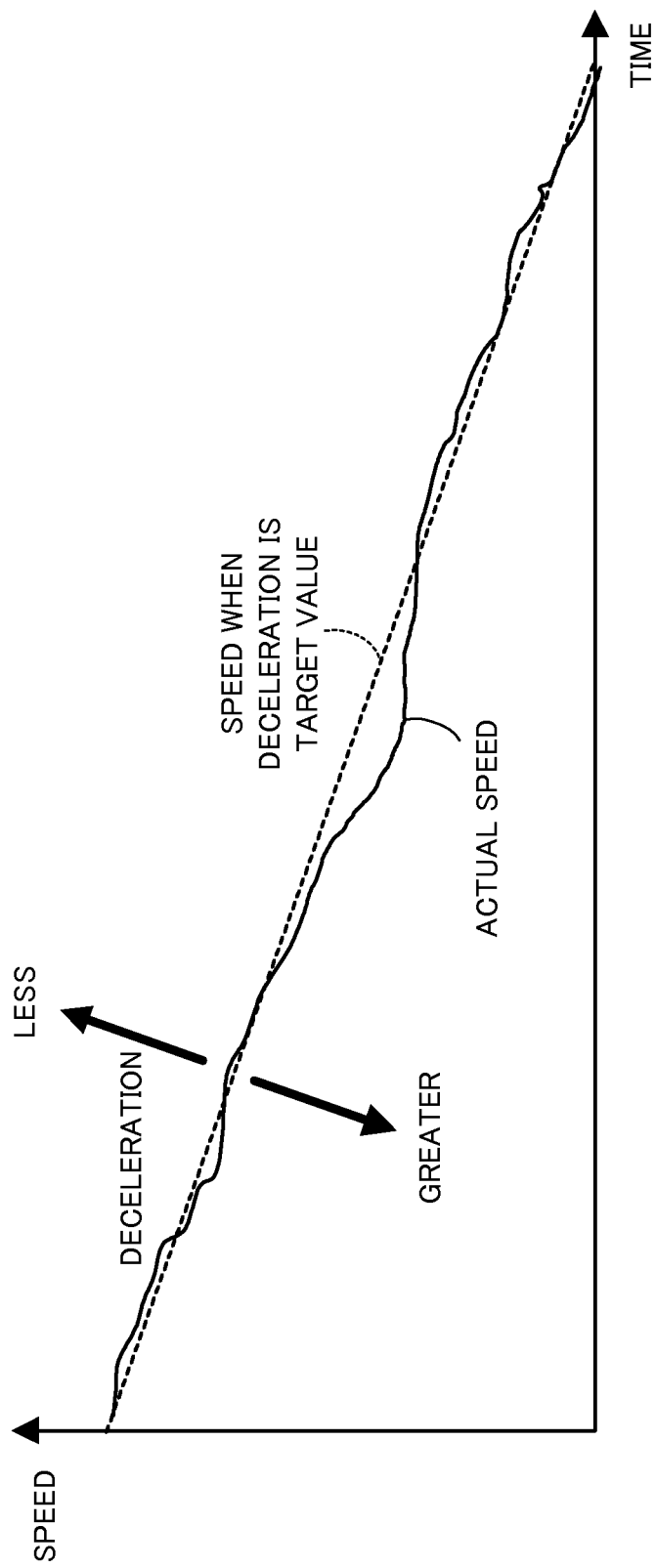
FIG. 5 is a graph illustrating change over time in car speed due to the brake control of Embodiment 1.
Figure 6:
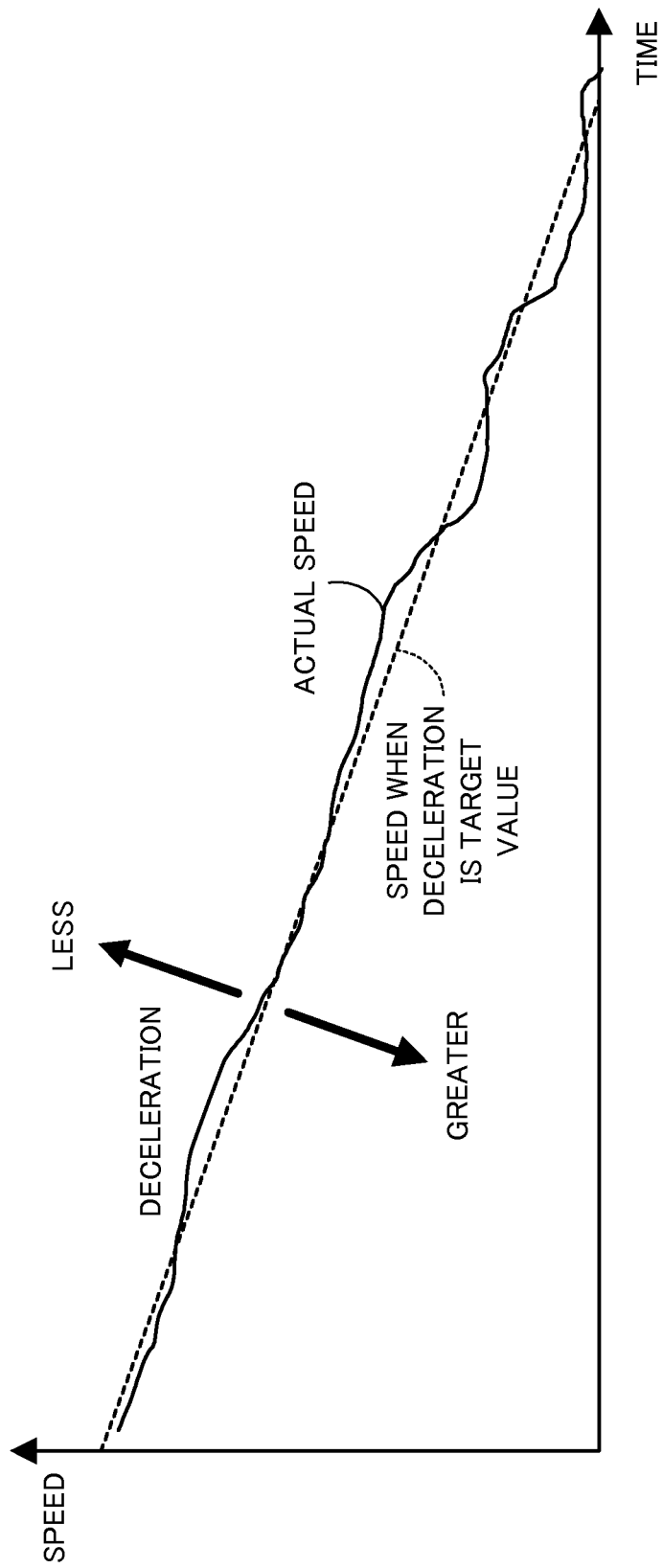
FIG. 6 is a graph illustrating change over time in car speed due to the brake control of Embodiment 1.
Figure 13:
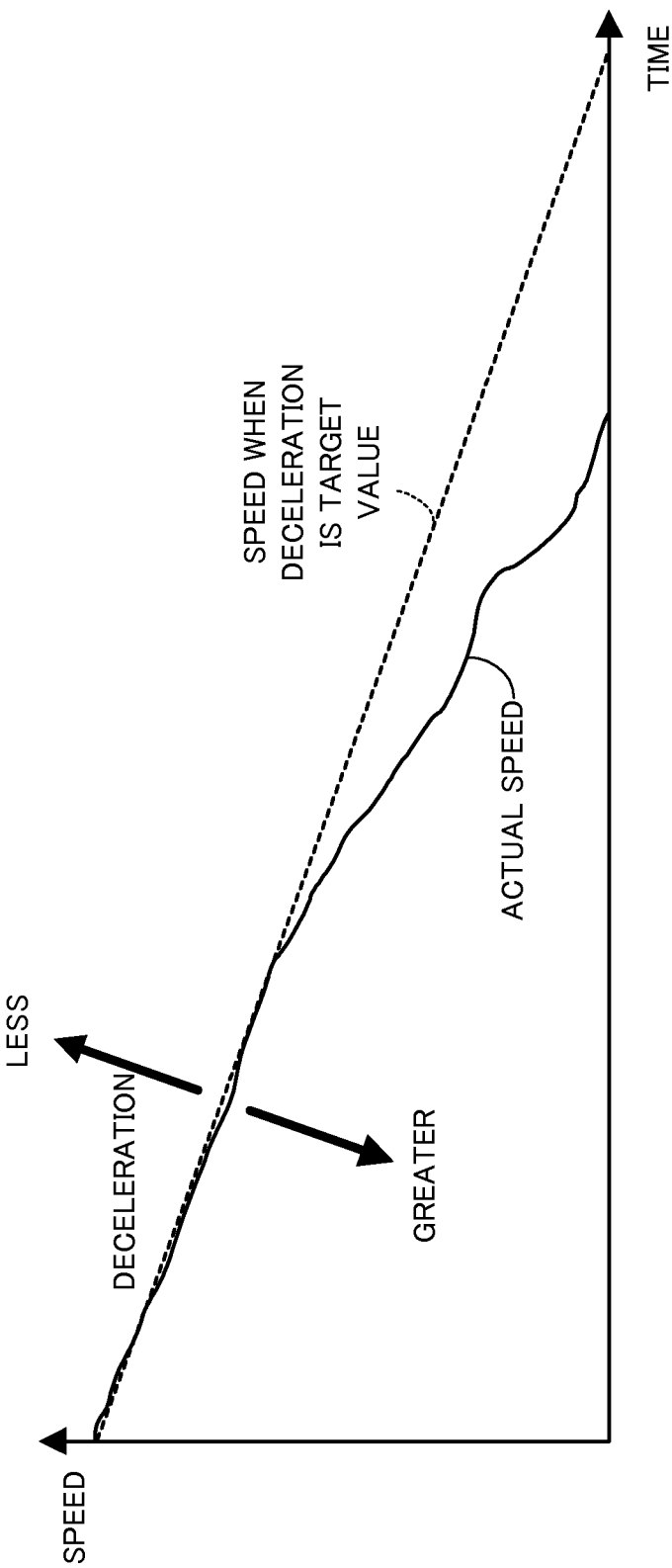
FIG. 13 is a graph illustrating change over time in car speed due to the brake control of the related art.

FIGS. 5 and 6 illustrate change over time in car speed due to the brake control of the present embodiment. FIG. 5 is a diagram corresponding to FIG. 13, and illustrates an example of the case where the target cylinder pressure (BC1) acquired by the first adder 160 is constant for a given amount of time (the case where there is no change in the air braking signal and the pneumatic subtraction command for a given amount of time). During the process of the car speed decreasing due to the braking action, the coefficient of friction becomes greater, and thus the braking force increases, and the actual value of the deceleration acquired by the actual deceleration acquirer 140 becomes greater. When the actual value of the deceleration surpasses the target value, the deceleration differential acquired by the deceleration differential information acquirer 141 becomes a negative value, and thus the target cylinder pressure correction value acquirer 142 outputs a signal indicating a negative target cylinder pressure correction value. As a result, the second adder 161 outputs a signal indicating a target cylinder pressure (BC2) that is less than the target cylinder pressure (BC1), thereby decreasing the cylinder pressure and weakening the braking force. For this reason, the deceleration is controlled near the target value without becoming great, as illustrated in FIG. 5.

Figure 14:
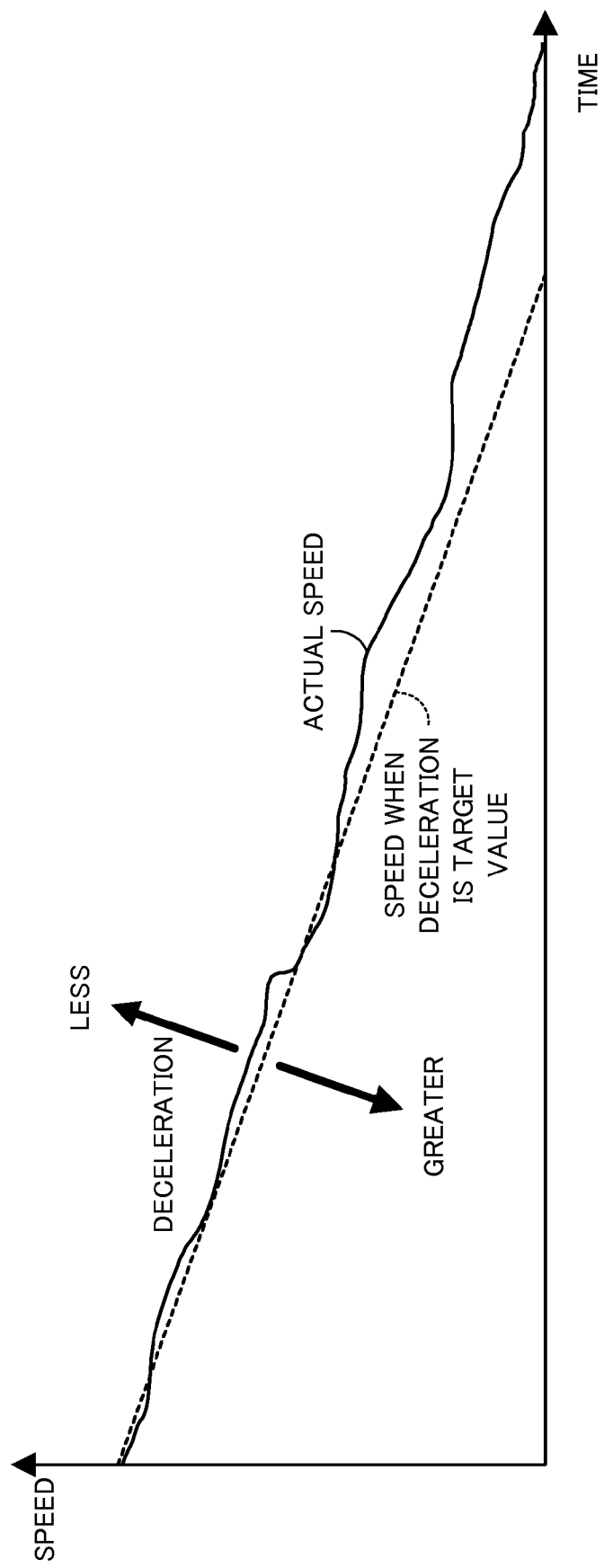
FIG. 14 is a graph illustrating change over time in car speed due to the brake control of the related art.

FIG. 6 is a diagram corresponding to FIG. 14, and illustrates an example of the case where the target cylinder pressure (BC1) acquired by the first adder 160 is constant before or after the car descends a hill (the case where there is no change in the air braking signal and the pneumatic subtraction command before or after descending a hill). In this case, when the car descends a hill, the deceleration of the car becomes less due to gravity, and thus the actual value of the deceleration acquired by the actual deceleration acquirer 140 becomes less. When the actual value of the deceleration falls below the target value, the deceleration differential acquired by the deceleration differential information acquirer 141 becomes a positive value, and thus the target cylinder pressure correction value acquirer 142 outputs a signal indicating a positive target cylinder pressure correction value. As a result, the second adder 161 outputs a signal indicating a target cylinder pressure (BC2) that is greater than the target cylinder pressure (BC1), thereby increasing the cylinder pressure and strengthening the braking force. For this reason, the deceleration is controlled near the target value without becoming less, as illustrated in FIG. 6.

Also, according to the present embodiment, the target cylinder pressure correction value is modified to "0 kPa" in the case where a slip occurs, and thus a target cylinder pressure is set without using a target cylinder pressure correction value. For this reason, it is possible to prevent the brake control from being conducted on the basis of an incorrect deceleration value. Note that the target cylinder correction value may be modified to a set value other than "0 kPa" that is suitable for resolving slippage.

Also, in the present embodiment, the speed sensor 107 may also measure deceleration from the rotational speed of the driving axle 115. In this case, the deceleration differential information acquirer 141 acquires a deceleration differential on the basis of signal from the speed sensor 107, and the actual deceleration acquirer 140 is omitted. Also, the integral or the derivative of the deceleration differential may be used in order to acquire a target cylinder pressure correction value.

Embodiment 2

Next, Embodiment 2 will be described. Embodiment 2 acquires a target cylinder pressure correction value by using the difference between the target value and actual value of the cylinder pressure (hereinafter, the cylinder pressure differential) in addition to the deceleration differential, taking into account that pressure amplification by the relay valve 132 may cause response delays and hunting in the cylinder pressure, or wear and heat deformation in the valving element of the relay valve 132 to occur, leading to a drop in the precision of setting the cylinder pressure.

Figure 7:
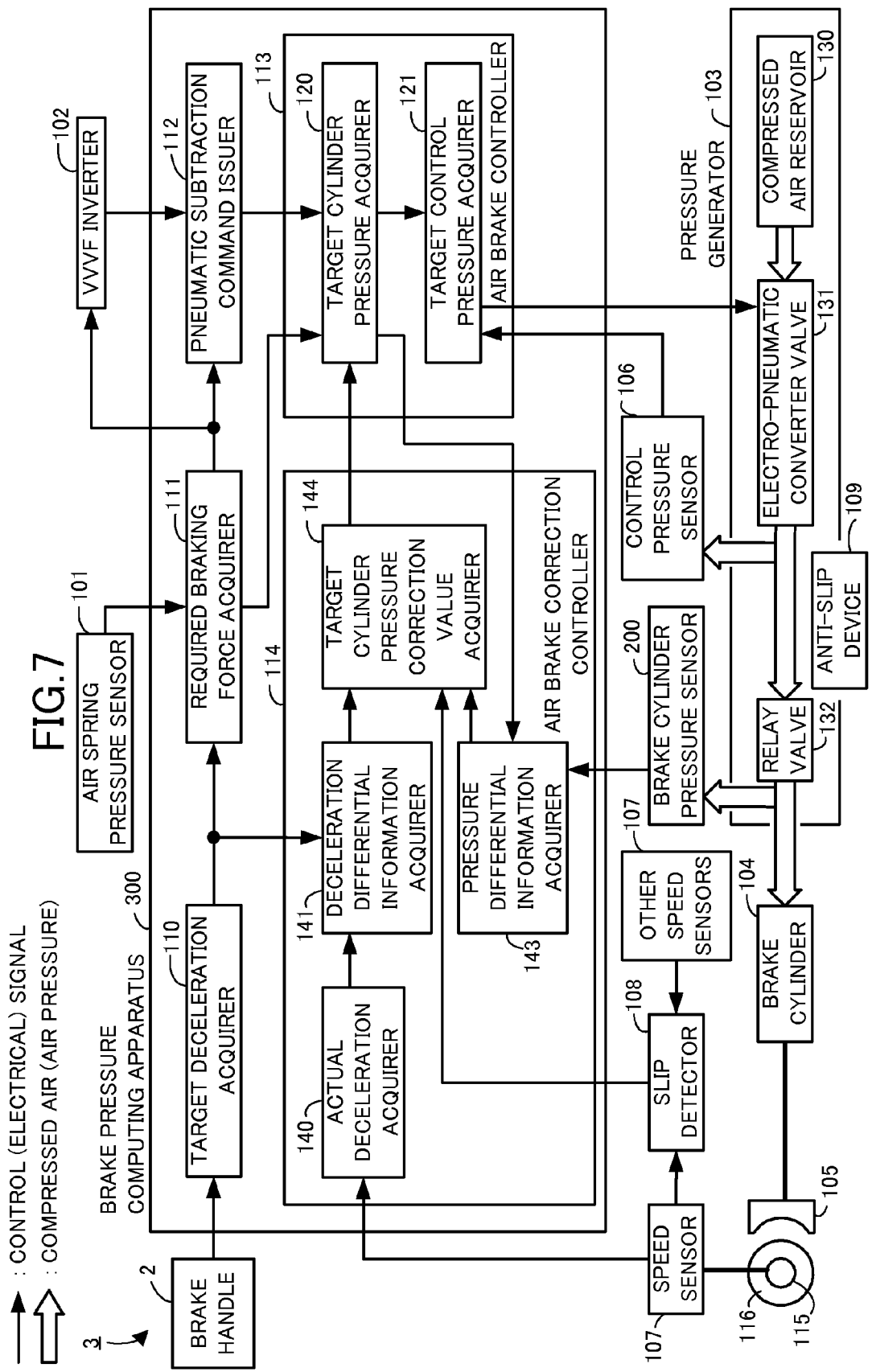
FIG. 7 is a block diagram of a brake control system according to Embodiment 2 of the present invention.

The brake control system 3 of Embodiment 2 illustrated in FIG. 7 is equipped with a brake cylinder pressure sensor 200 in addition to the configuration in FIG. 1. The brake cylinder pressure sensor 200 is disposed in a duct between the relay valve 132 and the brake cylinder 104. The brake cylinder pressure sensor 200 measures the actual value of the cylinder pressure (the actual value of the air pressure inside the brake cylinder 104), and outputs a signal indicating the actual value (hereinafter, the actual cylinder pressure signal) to the air brake correction controller 114. Also, the target cylinder pressure acquirer 120 outputs a target cylinder pressure signal to the target control pressure acquirer 121 and the air brake correction controller 114.

The air brake correction controller 114 is equipped with an actual deceleration acquirer 140, a deceleration differential information acquirer 141, a pressure differential information acquirer 143, and a target cylinder pressure correction value acquirer 144.

The actual deceleration acquirer 140 and the deceleration differential information acquirer 141 respectively acquire the actual value of the deceleration and deceleration differential information indicating the deceleration differential, similarly to Embodiment 1.

The pressure differential information acquirer 143 computes the cylinder pressure differential by subtracting the actual value of the cylinder pressure indicated by the actual cylinder pressure signal from the target value of the cylinder pressure indicated by the target cylinder pressure signal, and outputs pressure differential information indicating the cylinder pressure differential.

Figure 8:
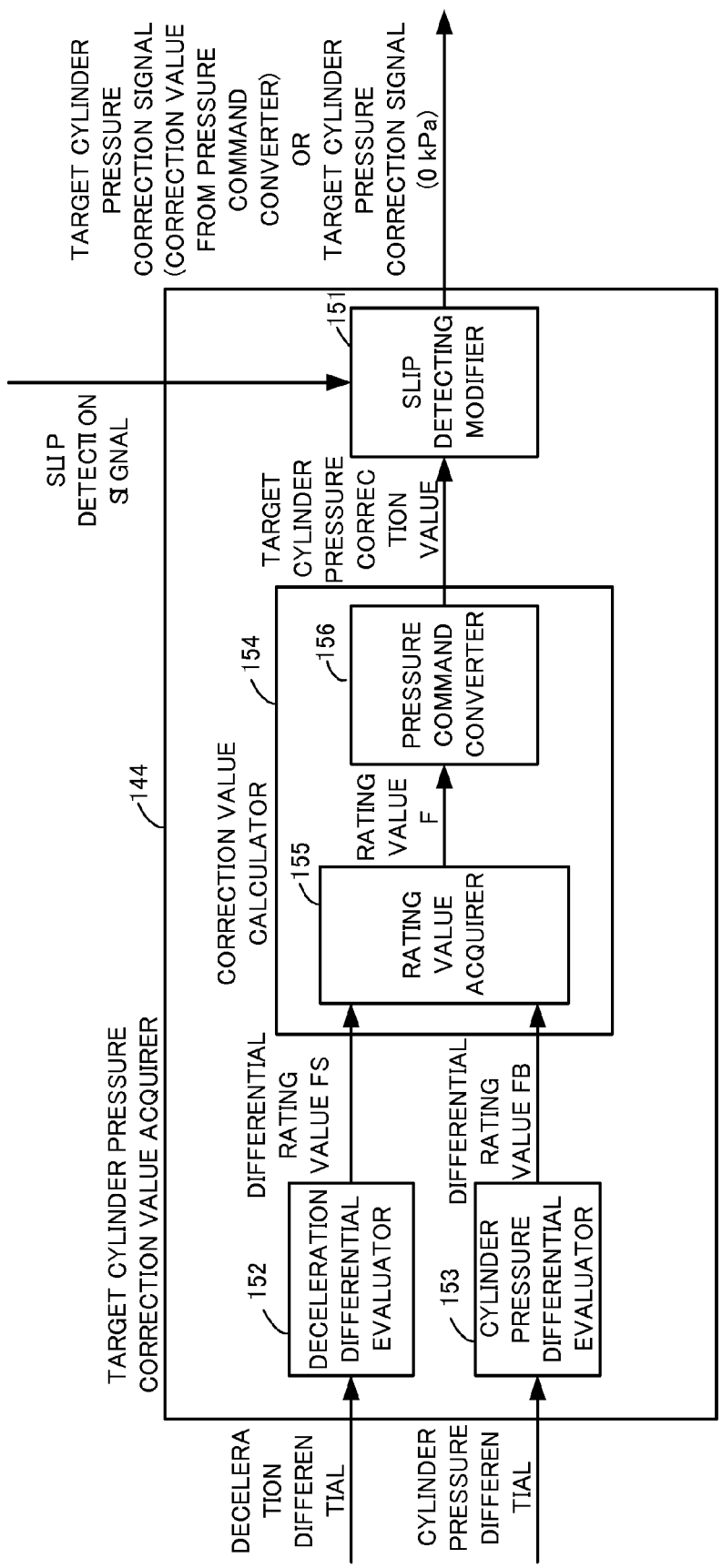
FIG. 8 is a block diagram illustrating a configuration of a target cylinder pressure correction value acquirer.

As illustrated in FIG. 8, the target cylinder pressure correction value acquirer 144 is equipped with a deceleration differential evaluator 152, a cylinder pressure differential evaluator 153, a correction value calculator 154, and a slip detecting modifier 151. Of these, the deceleration differential evaluator 152, the cylinder pressure differential evaluator 153, and the correction value calculator 154 use the deceleration differential and the cylinder pressure differential to acquire a target cylinder pressure correction value by fuzzy inference. With fuzzy inference, the membership functions illustrated in FIGS. 9 to 11 and the rule table illustrated in Table 1 are used.

Figure 9:
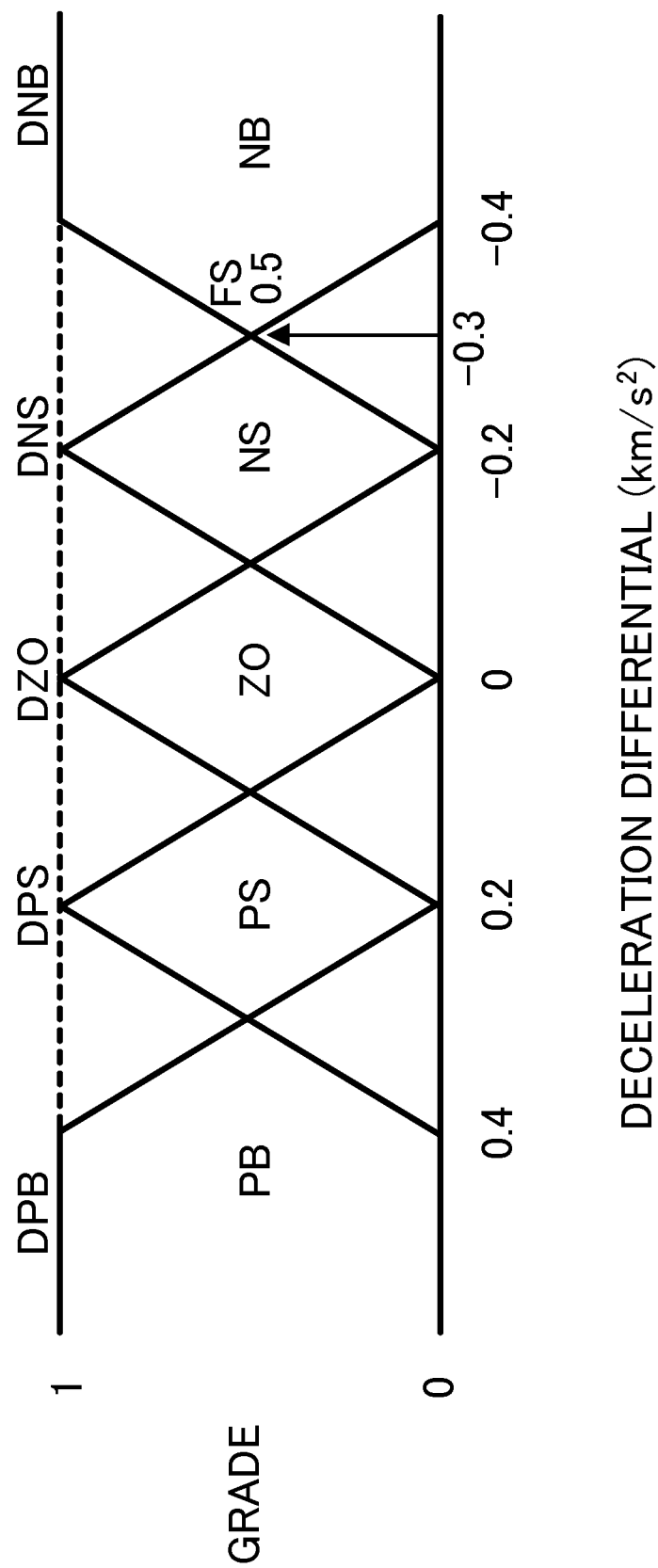
FIG. 9 is a diagram for explaining deceleration membership functions.

With the deceleration membership functions illustrated in FIG. 9, deceleration differentials are classified into fuzzy sets (1) to (5).
(1) PB: a fuzzy set classified by the deceleration membership function DPB, in which the deceleration differential is a positive value with a large absolute value.
(2) PS: a fuzzy set classified by the deceleration membership function DPS, in which the deceleration differential is a positive value with a small absolute value.
(3) ZO: a fuzzy set classified by the deceleration membership function DZO, in which the absolute value of the deceleration differential is approximately 0.
(4) NS: a fuzzy set classified by the deceleration membership function DNS, in which the deceleration differential is a negative value with a small absolute value.
(5) NB: a fuzzy set classified by the deceleration membership function DNB, in which the deceleration differential is a negative value with a large absolute value.

Figure 10:
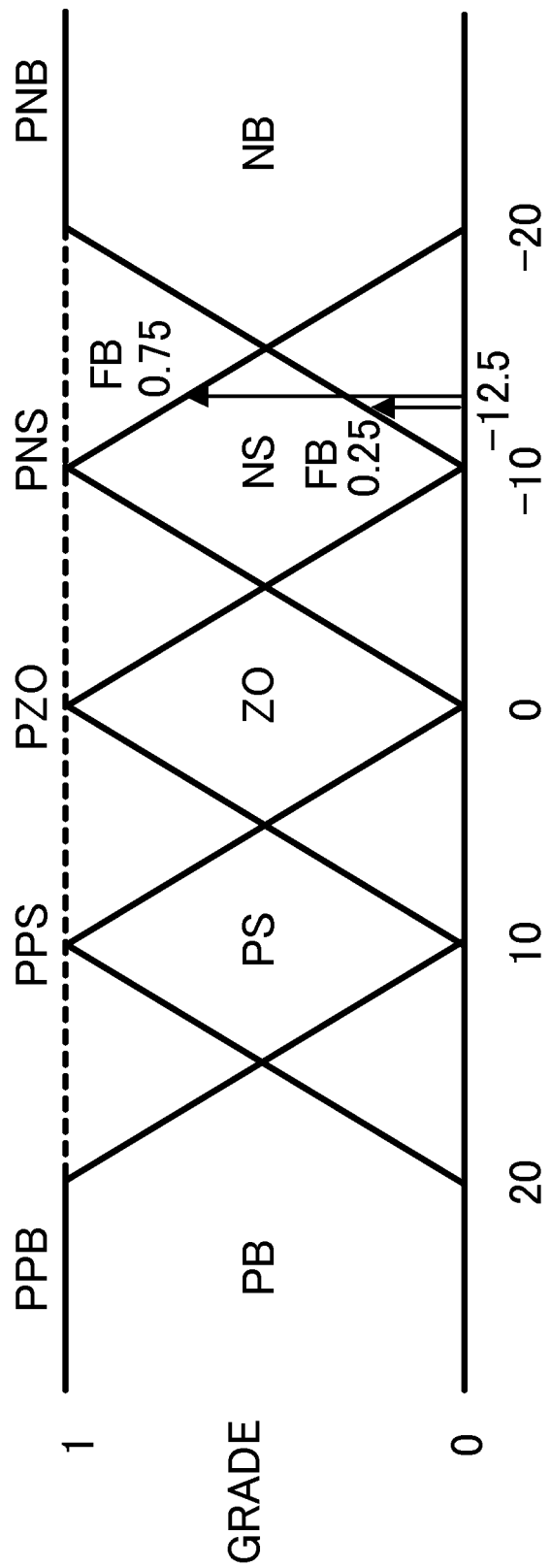
FIG. 10 is a diagram for explaining cylinder pressure membership functions.

With the cylinder pressure membership functions illustrated in FIG. 10, cylinder pressure differentials are classified into fuzzy sets (6) to (10).
(6) PB: a fuzzy set classified by the cylinder pressure membership function PPB, in which the cylinder pressure differential is a positive value with a large absolute value.
(7) PS: a fuzzy set classified by the cylinder pressure membership function PPS, in which the cylinder pressure differential is a positive value with a small absolute value.
(8) ZO: a fuzzy set classified by the cylinder pressure membership function PZO, in which the absolute value of the cylinder pressure differential is approximately 0.
(9) NS: a fuzzy set classified by the cylinder pressure membership function PNS, in which the cylinder pressure differential is a negative value with a small absolute value.
(10) NB: a fuzzy set classified by the cylinder pressure membership function PNB, in which the cylinder pressure differential is a negative value with a large absolute value.

Figure 11:
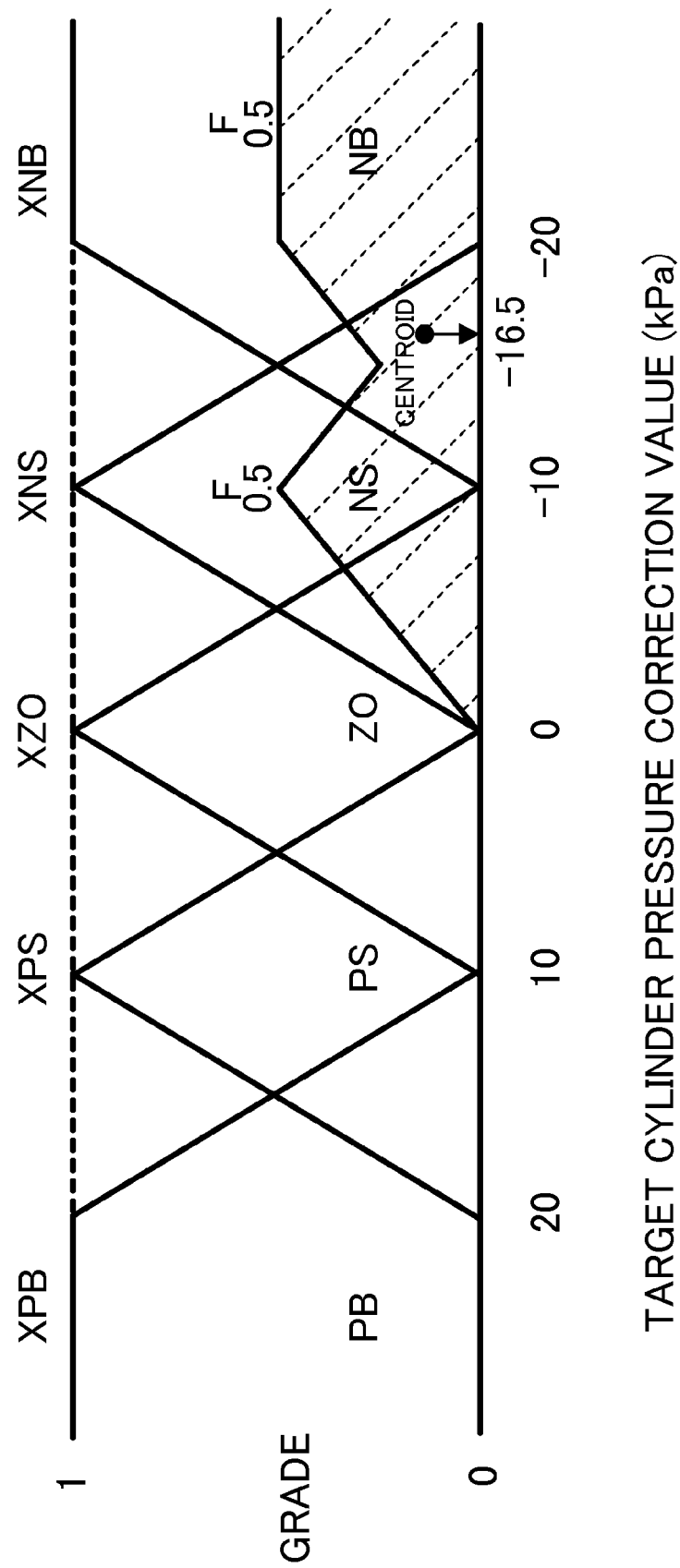
FIG. 11 is a diagram for explaining correction value membership functions.

With the correction value membership functions illustrated in FIG. 11, target cylinder pressure correction values are classified into fuzzy sets (11) to (15).
(11) PB: a fuzzy set classified by the correction value membership function XPB, in which the target cylinder pressure correction value is a positive value with a large absolute value.
(12) PS: a fuzzy set classified by the correction value membership function XPS, in which the

TABLE 1

|  |  | Col. 1 | Col. 2 | Col. 3 | Col. 4 | Col. 5 |
|---|---|---|---|---|---|---|
|  |  |  | Deceleration diff. |  |  |  |
|  | Cylinder pressure diff. | DPB (PB) | DPS (PS) | DZO (ZO) | DNS (NS) | DNB (NB) |
| Row 1 | PPB (PB) | XPB (PB) | XPB (PB) | XZO (ZO) | XZO (ZO) | XZO (ZO) |
| Row 2 | PPS (PS) | XPB (PB) | XPS (PS) | XZO (ZO) | XZO (ZO) | XNS (NS) |
| Row 3 | PZO (ZO) | XPS (PS) | XPS (PS) | XZO (ZO) | XNS (NS) | XNS (NS) |
| Row 4 | PNS (NS) | XPS (PS) | XZO (ZO) | XZO (ZO) | XNS (NS) | XNB (NB) |
| Row 5 | PNB (NB) | XZO (ZO) | XZO (ZO) | XZO (ZO) | XNB (NB) | XNB (NB) | target cylinder pressure correction value is a positive value with a small absolute value.
(13) ZO: a fuzzy set classified by the correction value membership function XZO, in which the absolute value of the target cylinder pressure correction value is approximately 0.
(14) NS: a fuzzy set classified by the correction value membership function XNS, in which the target cylinder pressure correction value is a negative value with a small absolute value.
(15) NB: a fuzzy set classified by the correction value membership function XNB, in which the target cylinder pressure correction value is a negative value with a large absolute value.

The rule table illustrated in Table 1 determines a rule for selecting a correction value membership function on the basis of the deceleration differential and the cylinder pressure differential. For example, the rule indicated at row 1, col. 1 determines that the correction value membership function XPB is selected in the case where the deceleration differential belongs to the positive value fuzzy set PB (the set of being classified by the function DPB), and in addition, the cylinder pressure differential belongs to the positive value fuzzy set PB (the set of being classified by the function PPB).

In the rule table, rules for selecting a correction value membership function are determined in order to set a target cylinder pressure correction values according to (1) and (2) below.
(1) In the case where the deceleration differential is a positive value, the target cylinder pressure correction value is a positive value, and the absolute value of the target cylinder pressure correction value is large when the cylinder pressure differential is a positive value, and small when the cylinder pressure differential is a negative value.
(2) In the case where the deceleration differential is a negative value, the target cylinder pressure correction value is a negative value, and the absolute value of the target cylinder pressure correction value is large when the cylinder pressure differential is a negative value, and small when the cylinder pressure differential is a positive value.

Hereinafter, a process executed in the case where a brake command specifying a deceleration target value of "1.8 km/h/s" is output from the brake handle 2 will be described as an example of a process by the brake control system 3 of Embodiment 2.

In response to the brake command, the target deceleration acquirer 110 outputs a target deceleration signal indicating the deceleration target value of "1.8 km/h/s" to the required braking force acquirer 111 and the air brake correction controller 114.

The required braking force acquirer 111, the VVVF inverter 102, and the pneumatic subtraction command issuer 112 conduct processing similar to the processing in Embodiment 1, and output an air braking force signal, an actual regenerative braking signal, and a pneumatic subtraction command.

The air brake controller 113 acquires a target value of the air braking force according to the difference between the air braking force indicated by the air braking force signal and the regenerative braking force indicated by the pneumatic subtraction command. In addition, the air brake controller 113 acquires a target cylinder pressure of "50 kPa", for example, on the basis of the target value of the air braking force, outputs a target cylinder pressure signal indicating "13 kPa" to the air brake correction controller 114, and outputs a valve command corresponding to the target cylinder pressure of "50 kPa" to the pressure generator 103.

In response to the valve command, the pressure generator 103 supplies the brake cylinder 104 with a cylinder pressure equivalent to the target cylinder pressure of "50 kPa". As a result, given air braking force is obtained due to the pressure equivalent to the target cylinder pressure of "50 kPa" acting on the brake shoe 105. The rotational speed of the target driving axle 115 while in the state where the air braking is occurring is measured by the speed sensor 107, and a rotational speed signal indicating the measured value is transmitted to the slip detector 108 and the air brake correction controller 114.

The brake cylinder pressure sensor 200 measures "62.5 kPa", for example, as the actual value of the cylinder pressure supplied to the brake cylinder 104, and outputs an actual cylinder pressure signal indicating "62.5 kPa" to the air brake correction controller 114.

The air brake correction controller 114 executes the following process due to being respectively input with a target deceleration signal from the target deceleration acquirer 110, a rotational speed signal from the speed sensor 107, a target cylinder pressure signal from the air brake controller 113, and an actual cylinder pressure signal from the brake cylinder pressure sensor 200.

The actual deceleration acquirer 140 acquires an actual deceleration value of "2.1 km/h/s", for example, from the rotational speed indicated by the rotational speed signal.

In this case, the deceleration differential information acquirer 141 acquires a deceleration differential of "−0.3 km/h/s" by subtracting the actual deceleration value of "2.1 km/h/s" from the target deceleration value of "1.8 km/h/s" indicated by the target deceleration signal.

The pressure differential information acquirer 143 acquires a cylinder pressure differential of "−12.5 kPa" by subtracting the actual cylinder pressure value of "62.5 kPa" indicated by the actual cylinder pressure signal from the target cylinder pressure of "50 kPa" indicated by the target cylinder pressure signal.

The deceleration differential evaluator 152 of the target cylinder pressure correction value acquirer 144 refers to the deceleration membership functions DNS and DNB (FIG. 9), and computes differential rating values FS of "0.5" and "0.5" corresponding to the deceleration differential of "−0.3 km/h/s". The cylinder pressure differential evaluator 153 of the target cylinder pressure correction value acquirer 144 refers to the cylinder pressure membership functions PNS and PNB (FIG. 10), and computes differential rating values FB of "0.75" and "0.25" corresponding to the cylinder pressure differential of "−12.5 km/h/s".

As illustrated in FIG. 8, the correction value calculator 154 of the target cylinder pressure correction value acquirer 144 is equipped with a rating value acquirer 155 and a pressure command converter 156. The rating value acquirer 155 selects a correction value membership function on the basis of the deceleration differential and the cylinder pressure differential, according to a rule determined in the rule table in Table 1. The deceleration differential of "−0.3 km/h/s" belongs to the fuzzy sets NS and NB, while the cylinder pressure differential of "−12.5 kPa" belongs to the fuzzy sets NS and NB. Thus, the correction value membership functions XNS and XNB are selected according to a rule 1 on row 4, col. 4, a rule 2 on row 4, col. 5, a rule 3 on row 5, col. 4, and a rule 4 on row 5, col. 5 in the rule table.

Subsequently, the rating value acquirer 155 computes the minimum values of the differential rating values FS and FB with respect to rules 1 to 4. With respect to rule 1, a minimum value of "0.5" is acquired from between the differential rating value FS of "0.5" obtained by referring the deceleration membership function DNS and the differential rating value FB of "0.75" obtained by referring the cylinder pressure membership function PNS. Similarly, a minimum value of "0.5" is acquired from between the differential rating values FS "0.5" and FB "0.75" with respect to rule 2, a minimum value of "0.25" is acquired from between the differential rating values FS "0.5" and FB "0.25" with respect to rule 3, and a minimum value of "0.25" is acquired from between the differential rating values FS "0.5" and FB "0.25" with respect to rule 4.

Subsequently, the rating value acquirer 155 acquires a rating value F used to transform the correction value membership functions XNS and XNB from the above minimum values for the differential rating values. The minimum value of "0.5" for the differential rating value from rule 1 is acquired as the rating value F of the correction value membership function XNS. The maximum value of "0.5" from among the minimum values of "0.5", "0.25", and "0.25" for the differential rating values from rules 2 to 4 is acquired as the rating value F of the correction value membership function XNB.

The pressure command converter 156 transforms the correction value membership functions XNS and XNB on the basis of the rating values F of "0.5" and "0.5". As illustrated in FIG. 11, this transformation is conducted such that the maximum values of the correction value membership functions XNS and XNB respectively become the rating values F of "0.5" and "0.5".

Subsequently, the pressure command converter 156 identifies the centroid of the range (the shaded range in FIG. 11) classified by the transformed correction value membership functions XNS and XNB. As a result, "−16.5 kPa" is acquired as the target brake cylinder pressure correction value.

The slip detecting modifier 151 outputs a target cylinder pressure correction signal which indicates either the target cylinder pressure correction value of "−16.5 kPa" acquired by the pressure command converter 156, or "0 kPa", to the air brake controller 113, depending on whether or not a slip detection signal is input.

In the case where a target cylinder correction signal indicating a target cylinder pressure correction value of "16.5 kPa" is input, the target cylinder pressure acquirer 120 of the air brake controller 113 adds "−16.5 kPa" to the target cylinder pressure of "50 kPa" to acquire a target cylinder pressure BC2 of "33.5 kPa", and outputs a target cylinder pressure signal indicating "33.5 kPa" to the target control pressure acquirer 121.

Meanwhile, in the case where a target cylinder pressure correction signal indicating a target cylinder pressure correction value of "0 kPa" is input due to a slip occurring, the target cylinder pressure acquirer 120 acquires "50 kPa" as the target cylinder pressure BC2, and outputs a target cylinder pressure signal indicating "50 kPa" to the target control pressure acquirer 121.

The target control pressure acquirer 121 outputs a valve command corresponding to the target cylinder pressure BC2 indicated by the target cylinder pressure signal ("33.5 kPa" or "50 kPa") to the pressure generator 103.

As a result, in the case where a slip has not occurred, the brake cylinder is supplied with a cylinder pressure equivalent to "33.5 kPa". Thus, the actual value of the cylinder pressure is greatly reduced from "62.5 kPa", the braking force decreases, and the actual value of the deceleration becomes less than "2.1 km/h/s" and approaches the target value of "1.8 km/h/s".

Meanwhile, in the case where a slip has occurred, the cylinder pressure supplied to the brake cylinder becomes equivalent to "50 kPa", and variation from "62.5 kPa" is suppressed. Also, a slip detection signal is input into the anti-slip device 109 and the air pressure supplied to the relay valve 132 is reduced, suppressing slippage.

According to the present embodiment, a target cylinder pressure correction value is set on the basis of a deceleration differential as well as a cylinder pressure differential. For this reason, it is possible to control the deceleration near a target value, even in the case where response delays or hunting occur in the cylinder pressure, or wear or heat deformation occur in the valving element of the relay valve 132, leading to a drop in the precision of setting the cylinder pressure.

Also, rules based on the deceleration differential and the cylinder pressure differential are determined by fuzzy inference to acquire a target cylinder pressure correction value. For this reason, it is possible to apply brake control according to conditions predicted from the deceleration differential and the cylinder pressure differential.

For example, in the case where a positive value is acquired for the deceleration differential (the case where the actual value of the deceleration is less than the target value), a conceivable cause is an insufficiency of compressed air supplied to the brake cylinder 104, such that the cylinder pressure is not reaching the target value. The question of whether these conditions are actually occurring can be predicted from the value of the cylinder pressure differential. In other words, in the case where the cylinder pressure differential is a positive value (the case where the actual value of the cylinder pressure is less than the target value), it is predicted that the above condition of insufficient compressed air is occurring. Meanwhile, in the case where the cylinder pressure differential is a negative value, it is predicted that the deceleration differential has become a positive value due to another reason (such as slippage occurring).

The present embodiment determines a rule for computing a target cylinder pressure correction value on the basis of conditions predicted from the deceleration differential and the cylinder pressure differential in this way. In the former case, a positive target cylinder pressure correction value with a large absolute value is acquired by the target cylinder pressure correction value acquirer 144, and the target cylinder pressure is greatly raised. Thus, since the compressed air supplied to the brake cylinder 104 is increased, the deceleration can be controlled near the target value. Also, in the latter case, a target cylinder pressure correction value with a small absolute value is acquired by the target cylinder pressure correction value acquirer 144. Thus, the compressed air supplied to the brake cylinder 104 is kept constant without raising the target cylinder pressure. In so doing, it is possible to avoid taking inappropriate measures in bringing the deceleration near to a target value.

Note that in the present embodiment, the integral or the derivative of the deceleration differential or the cylinder pressure differential may be used in order to acquire a target cylinder pressure correction value.

Also, fuzzy inference is merely an example of a technique for acquiring a target cylinder pressure correction value, and means for acquiring a target cylinder pressure correction value by another technique may be provided instead of the deceleration differential evaluator 152, the cylinder pressure differential evaluator 153, and the correction value calculator 154. For example, there may be provided a differential sign determining means that determines whether or not the deceleration differential is positive, a correction value sign setting means that sets the sign of the target cylinder pressure correction value on the basis of the determination result from the differential sign determining means, and an absolute value setting means that sets the absolute value of the target cylinder pressure correction value on the basis of the cylinder pressure differential. The sign setting means sets the sign of the target cylinder pressure correction value to positive in the case where the deceleration differential is determined to be positive, and sets the sign of the target cylinder pressure correction value to negative in the case where the deceleration differential is determined to be negative. The absolute value setting means sets the absolute value of the target cylinder pressure correction value to a value obtained by substituting the cylinder pressure differential into a given function. The function used as the above function may be a linear function expressing a relationship between the cylinder pressure differential and the absolute value of the target cylinder pressure correction value, for example.

Embodiment 3

Figure 12:
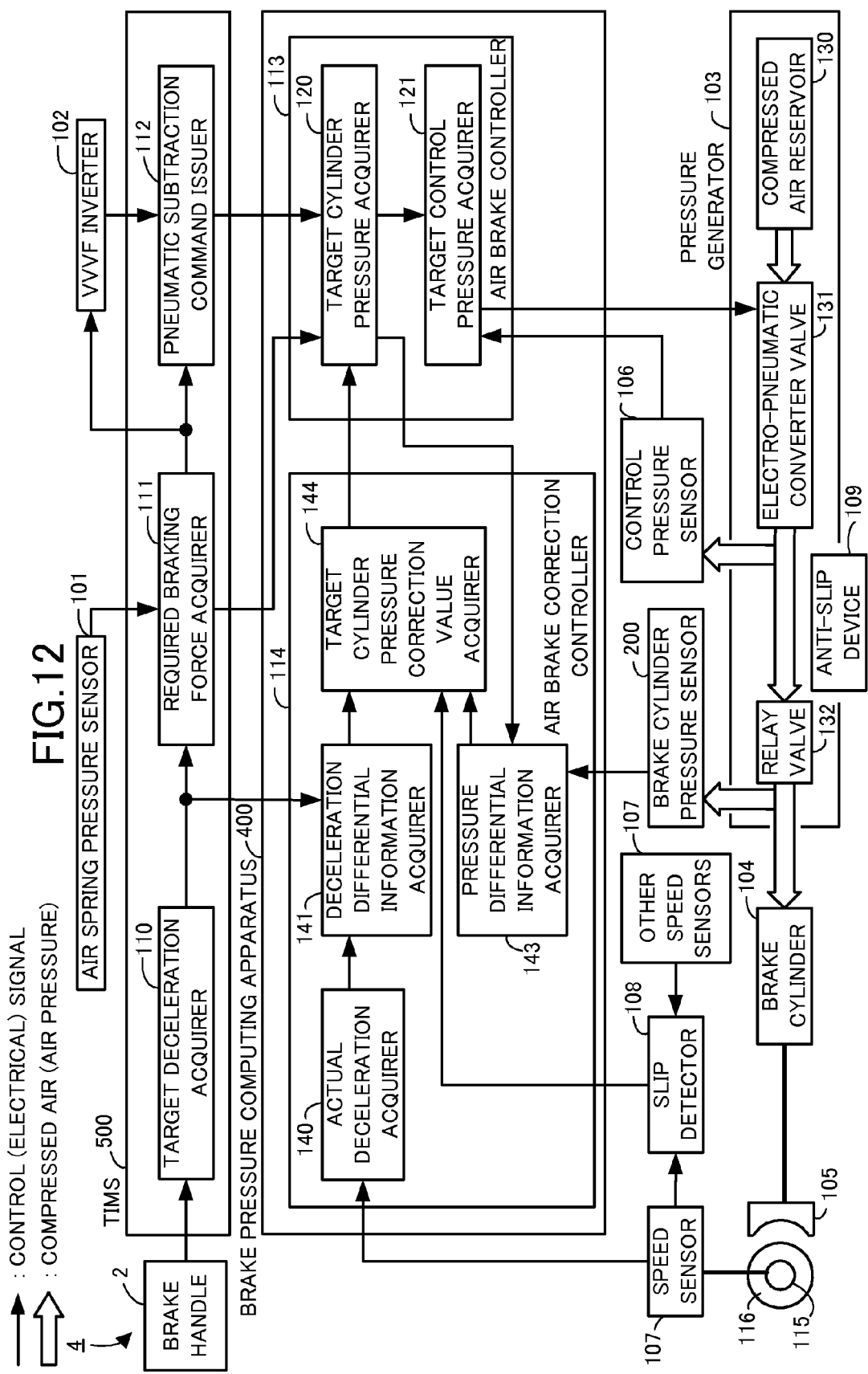
FIG. 12 is a block diagram of a brake control system according to Embodiment 3 of the present invention.

Next, Embodiment 3 of the present invention will be described. As illustrated in FIG. 12, in the brake control system 4 of the present embodiment, the brake pressure computing apparatus 400 comprises an air brake controller 113 and an air brake correction controller 114. The target deceleration acquirer 110, the required braking force acquirer 111, and the pneumatic subtraction command issuer 112 constitute a train information management system (TIMS) 500.

The brake pressure computing apparatus 400 is multiply provided for each of the target driving axle 115 and the other driving axles 115. In the case of a malfunction occurring in one of the brake pressure computing apparatuses 400, the TIMS 500 transmits signals output by the required braking force acquirer 111 and the pneumatic subtraction command issuer 112 (an air brake signal and a pneumatic subtraction command) to other brake pressure computing apparatuses 400. The other brake pressure computing apparatuses 400 acquire a target cylinder pressure on the basis of the required braking force and the regenerative braking force computed for the first brake pressure computing apparatus 400 from the above signals, and output a valve command. Also, in the case of a malfunction occurring in one of the brake pressure computing apparatuses 400, the TIMS 500 transmits a malfunction signal to the driver's seat.

According to the present embodiment, braking force can be distributed to other driving axles 115 in the case of a malfunction occurring in a brake pressure computing apparatuses 400. For this reason, accidents are prevented. Also, the TIMS 500 transmits a malfunction signal prompting operation of the brake handle 2 to change the braking force. For this reason as well, accidents are prevented.

Note that the brake pressure computing apparatus 400 may also be multiply provided for each truck provided in the car, and the air braking force applied to the two driving axles 115 provided in a truck may be controlled by valve commands output by a single brake pressure computing apparatus 400. In this case, each brake pressure computing apparatus is respectively input with rotational speed signals and actual cylinder pressure signals from the speed sensors 107 and the brake cylinder pressure sensors 200 provided for the above two driving axles 115. Each brake pressure computing apparatus 400 acquires an actual deceleration value and an actual cylinder pressure value from the average values for the rotational speed and cylinder pressure indicated by the above signals, and uses these values to compute the deceleration differential and the cylinder pressure differential.

Note that in the foregoing Embodiments 1 to 3, the brake pressure computing apparatus 100, 300, and 400 may be configured with a computer, such as a single-chip microprocessor or board computer, and may also be configured as discrete circuits.

In the case of configuring the brake pressure computing apparatus 100, 300, and 400 as a computer, a computer program for executing their behavior is stored in memory, and the various functions discussed above are realized by executing the program. In this case, the brake pressure computing apparatus 100, 300, and 400 are configured by distributing the computer program stored on a computer-readable recording medium (such as a flexible disk, CD-ROM, or DVD-ROM), and installing the computer program onto a computer. The brake pressure computing apparatus 100, 300, and 400 may also be configured by storing the computer program in a storage device included in a server on a communication network such as the Internet, and causing an ordinary computer system to download or otherwise receive the computer program.

Also, in the case of being configured from discrete circuits, the target deceleration acquirer 110, the required braking force acquirer 111, the pneumatic subtraction command issuer 112, the air brake controller 113, and the air brake correction controller 114 constituting the brake pressure computing apparatus 100, 300, and 400 may be made into circuit blocks, either individually or in arbitrary combinations.

Furthermore, the configuration and operation of the above anti-slip device 109 illustrates an example of an anti-slip mechanism, and it is possible to implement other arbitrary configurations.

Note that various embodiments and alterations of the present invention are possible without departing from the scope and spirit of the present invention. Furthermore, the foregoing embodiments are for the purpose of describing the present invention, and do not limit the scope of the present invention. In other words, the scope of the present invention is indicated by the claims rather than the embodiments. In addition, various alterations performed within the scope of the claims or within an equivalent scope of the significance of the present invention are to be regarded as being within the scope of the present invention.

INDUSTRIAL APPLICABILITY

The present invention may be suitably adopted in a brake apparatus that produces braking force by supplying air pressure to a brake cylinder.

REFERENCE SIGNS LIST

1, 3, 4 Brake control system
2 Brake handle
100, 300, 400 Brake pressure computing apparatus
101 Air spring pressure sensor
102 VVVF inverter
103 Pressure generator
104 Brake cylinder
105 Brake shoe
106 Control pressure sensor
107 Speed sensor
108 Slip detector
109 Anti-slip device
110 Target deceleration acquirer
111 Required braking force acquirer
112 Pneumatic subtraction command issuer
113 Air brake controller
114 Air brake correction controller
115 Driving axle
116 Wheel
120 Target cylinder pressure acquirer
121 Target control pressure acquirer
130 Compressed air reservoir
131 Electro-pneumatic converter valve
132 Relay valve
140 Actual deceleration acquirer
141 Deceleration differential information acquirer
142, 144 Target cylinder pressure correction value acquirer
143 Pressure differential information acquirer
144 Target cylinder pressure correction value acquirer
150 Correction value calculator
151 Slip detecting modifier
152 Deceleration differential evaluator
153 Cylinder pressure differential evaluator
154 Correction value calculator
155 Rating value acquirer
156 Pressure command converter
160 First adder
161 Second adder
200 Brake cylinder pressure sensor
500 TIMS

The invention claimed is:

1. A brake pressure computing apparatus that acquires a target cylinder pressure, the target cylinder pressure being a target value of the pressure inside the brake cylinder of an air brake, the brake pressure computing apparatus comprising:
a target cylinder pressure acquirer that acquires the target cylinder pressure on the basis of a required braking force and a target cylinder pressure correction value;
a deceleration differential information acquirer that acquires deceleration differential information indicating a deceleration differential, the difference between the target value of the deceleration and the actual value of the deceleration;
a pressure differential information acquirer that acquires pressure differential information indicating a cylinder pressure differential, the difference between the target cylinder pressure and the actual value of the pressure inside the brake cylinder; and
a target cylinder pressure correction value acquirer that acquires the target cylinder pressure correction value on the basis of the deceleration differential information and the pressure differential information, wherein
the target cylinder pressure correction value acquirer sets a sign of the target cylinder pressure correction value to positive or negative on the basis of the deceleration differential information, and sets an absolute value of the target cylinder pressure correction value on the basis of the pressure differential information.

2. The brake pressure computing apparatus according to claim 1, wherein
the target cylinder pressure correction value acquirer acquires the target cylinder pressure correction value using fuzzy inference.

3. The brake pressure computing apparatus according to claim 2, wherein the target cylinder pressure correction value acquirer sets a membership function for classifying the deceleration differential and the cylinder pressure differential, sets a fuzzy rule for obtaining the target cylinder pressure correction value on the basis of the deceleration differential and the cylinder pressure differential, obtains a first rating value that corresponds to the deceleration differential indicated by the deceleration differential information and a second rating value that corresponds to the cylinder pressure differential indicated by the pressure differential information with reference to the membership function, and acquires the target cylinder pressure correction value on the basis of the first and second rating values and the fuzzy rule.

4. The brake pressure computing apparatus according to claim 1, further comprising:
a slip detecting modifier that modifies the target cylinder pressure correction value to a given value in the case where a slip is detected.

5. The brake pressure computing apparatus according to claim 1, wherein
the target cylinder pressure acquirer acquires the target cylinder pressure additionally on the basis of a regenerative braking force set from the required braking force.

6. A brake control system, comprising:
the brake pressure computing apparatus according to claim 1; and
a pressure generator that produces pressure inside the brake cylinder of the air brake on the basis of the target cylinder pressure computed by the brake pressure computing apparatus.

7. A brake control system, comprising:
a plurality of the brake pressure computing apparatus according to claim 1;
wherein, in the case where a malfunction occurs in one of the brake pressure computing apparatuses, other brake pressure computing apparatuses acquire the target cylinder pressure on the basis of required braking force computed for the first brake pressure computing apparatus.

8. A non-transitory computer-readable memory medium storing a program that acquires a target cylinder pressure, the target cylinder pressure being a target value of the pressure inside the brake cylinder of an air brake, the program causing a computer to function as a target cylinder pressure acquirer that acquires the target cylinder pressure on the basis of a required braking force and a target cylinder pressure correction value,
a deceleration differential information acquirer that acquires deceleration differential information indicating a deceleration differential, the difference between the target value of the deceleration and the actual value of the deceleration,
a pressure differential information acquirer that acquires pressure differential information indicating a cylinder pressure differential, the difference between the target cylinder pressure and the actual value of the pressure inside the brake cylinder, and
a target cylinder pressure correction value acquirer that acquires the target cylinder pressure correction value on the basis of the deceleration differential information and the pressure differential information, wherein
the target cylinder pressure correction value acquirer sets a sign of the target cylinder pressure correction value to positive or negative on the basis of the deceleration differential information, and sets an absolute value of the target cylinder pressure correction value on the basis of the pressure differential information.

\* \* \* \* \*